United States Patent [19]

Iwasa et al.

[11] Patent Number: 5,548,169

[45] Date of Patent: Aug. 20, 1996

[54] MOTOR WITH BUILT-IN CAPACITOR

[75] Inventors: Takao Iwasa; Takaji Kambayashi, both of Kashiwa, Japan

[73] Assignee: Oriental Motor Co., Ltd., Tokyo, Japan

[21] Appl. No.: 392,163

[22] Filed: Feb. 22, 1995

[30] Foreign Application Priority Data

Feb. 22, 1994 [JP] Japan ..................................... 6-022980

[51] Int. Cl.$^6$ .................................................. H02K 11/00
[52] U.S. Cl. ........................... 310/72; 310/68 R; 310/83; 310/90
[58] Field of Search ................................. 310/72, 62, 83, 310/90, 68 R, 51

[56] References Cited

U.S. PATENT DOCUMENTS

| | | | |
|---|---|---|---|
| 2,032,129 | 2/1936 | Jackson | 310/72 |
| 4,211,944 | 7/1980 | Haller | 310/72 |
| 4,400,140 | 8/1983 | Papst | 310/72 |
| 4,429,242 | 1/1984 | Layh | 310/71 |
| 4,750,077 | 6/1988 | Amagasa | 310/72 |
| 4,904,891 | 1/1990 | Baker | 310/62 |
| 5,343,774 | 9/1994 | Jang | 310/83 |

*Primary Examiner*—R. Skudy
*Attorney, Agent, or Firm*—Jacobson, Price, Holman & Stern, PLLC

[57] ABSTRACT

A motor with a built-in capacitor is proposed. The capacitor is formed into a ring so that a shaft of the motor penetrates a center portion of the capacitor and is disposed in the motor so that the shaft of the motor penetrates the center portion. The capacitor is mounted at the same time as the motor is mounted and the mounting work of the capacitor is easy. The external shape of the motor itself is the same as that of a conventional motor. The whole structure of the motor is compact as compared with the conventional motor. The motor can be applied to a motor with a capacitor directly connected to a gear mechanism such as a transmission.

2 Claims, 5 Drawing Sheets

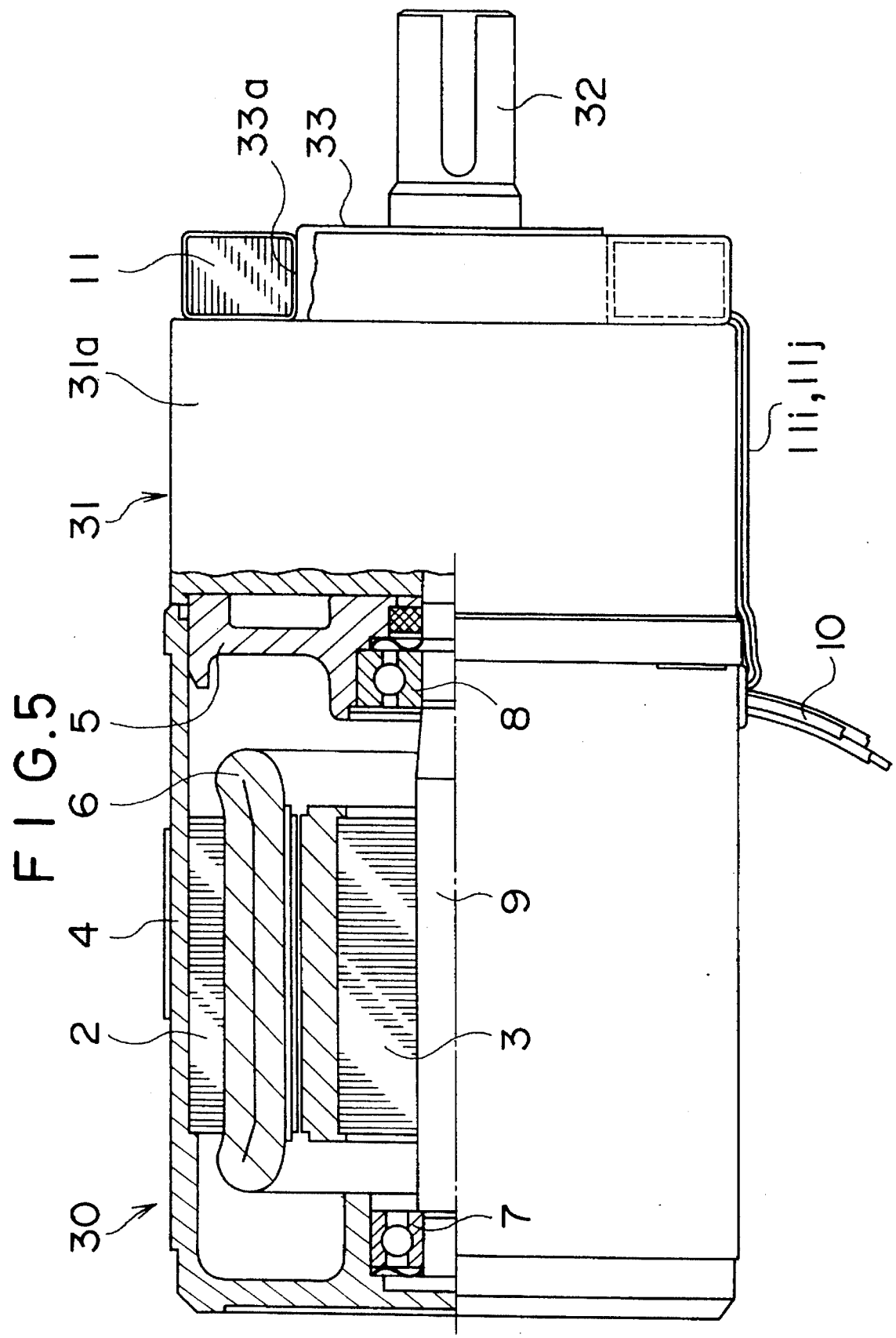

MOTOR WITH BUILT-IN CAPACITOR

FIELD OF THE INVENTION AND RELATED ART

The present invention relates to a motor with a built-in capacitor (condenser), for example, such as a motor using a capacitor only upon starting or a motor always operated together with a capacitor.

As motors of this kind, there are, for example, a single-phase capacitor-start induction motor and a single-phase capacitor induction motor.

The single-phase capacitor-start induction motor includes a main winding, an auxiliary winding having the number of turns larger than that of the main winding, and a starting circuit having a capacitor connected in series to the auxiliary winding. After the motor is started, a switch is automatically operated to disconnect the starting circuit, so that the motor is operated in a single phase with only the main winding.

The single-phase capacitor induction motor does not disconnect a capacitor after the motor is started and always uses the capacitor so that the motor is started and operated together with the capacitor.

OBJECTS AND SUMMARY OF THE INVENTION

In the conventional motors using the capacitor, the capacitor is disposed separately from a motor body or is mounted on the side portion of the motor body. Accordingly, there is a problem that mounting of the motor is complicated and its external size is large.

As the conventional motor using the capacitor, there is a motor with a built-in capacitor, while there is a problem that the whole length of the motor with the built-in capacitor is increased by the size of the capacitor.

It is an object of the present invention to solve the above problems by providing a motor with a built-in capacitor capable of being mounted easily and having the same external size as that of a conventional motor.

It is another object of the present invention to provide a motor with a built-in capacitor including a gear mechanism such as a transmission directly connected thereto, capable of being mounted easily and having the substantially same external size of the whole motor including the gear mechanism as that of a conventional motor.

In order to achieve the above objects, the motor with the built-in capacitor according to the present invention such as, for example, a motor started by means of a capacitor or a motor always operated together with a capacitor is configured as follows:

(1) The capacitor of the motor according to a first embodiment is formed into a ring so that a shaft of the motor penetrates a center portion of the capacitor and the capacitor is disposed within the motor so that the shaft of the motor penetrates, the center portion of the capacitor.

The capacitor may be of any kind as far as the capacitor is formed into a ring or doughnut so that the shaft of the motor or a bearing portion thereof, or an output shaft of a gear mechanism or a bearing portion thereof in a case of the motor directly connected to the gear mechanism, penetrates the center portion of the capacitor.

(2) The capacitor of the motor in the first embodiment is preferably disposed at the inner side of the case of the motor so that the center portion of the capacitor is in contact with an outer periphery of the bearing portion of the motor.

(3) The capacitor of the motor preferably includes a dielectric film and evaporated electrodes formed on both sides of the dielectric film or metal foil electrodes disposed on the dielectric film. The electrodes are wound into a whirlpool together with the dielectric film and the whole capacitor is formed into a ring. Leads or terminals electrically connected to the electrodes are disposed externally of the capacitor.

(4) The motor in the first embodiment is a motor with a fan.

(5) The capacitor of the motor according to a second embodiment is formed into a ring so that the shaft of the motor or the bearing portion thereof penetrates the center portion of the capacitor and the capacitor is disposed on an outer side of a case of the gear mechanism directly connected to the motor so that the output shaft of the gear mechanism or the bearing portion thereof penetrates the center portion of the capacitor.

As apparent from the above description, according to the motor with the capacitor of the present invention, in the motor of the first embodiment which is started by means of the capacitor or which is always operated together with the capacitor, the capacitor is formed into a ring so that the shaft of the motor penetrates the center portion of the capacitor and the capacitor is disposed within the motor so that the shaft of the motor penetrates the center portion of the capacitor. Accordingly, the capacitor is mounted at the same time as the motor is mounted and the mounting work thereof is easy. The external shape of the motor itself is the same as that of the conventional motor. The whole structure of the motor is compact as compared with the conventional motor.

The motor according to the second embodiment is the motor with the capacitor which is directly connected to the gear mechanism such as a transmission. The capacitor is formed into a ring so that the shaft or the bearing portion thereof penetrates the center portion of the capacitor and the capacitor is disposed on the outer side of the case of the gear mechanism directly connected to the motor so that the output shaft of the gear mechanism or the bearing portion thereof penetrates the center portion of the capacitor. Accordingly, the capacitor is mounted at the same time as the motor is mounted and the mounting work thereof is easy. The external shape of the motor is the substantially same as that of the conventional motor. The whole structure of the motor is compact as compared with the conventional motor.

BRIEF DESCRIPTION OF THE DRAWINGS

FIG. 5 is a partially sectional view of a motor with a transmission showing another modification of the embodiment.

DETAILED DESCRIPTION OF PREFERRED EMBODIMENTS

Figure 1:
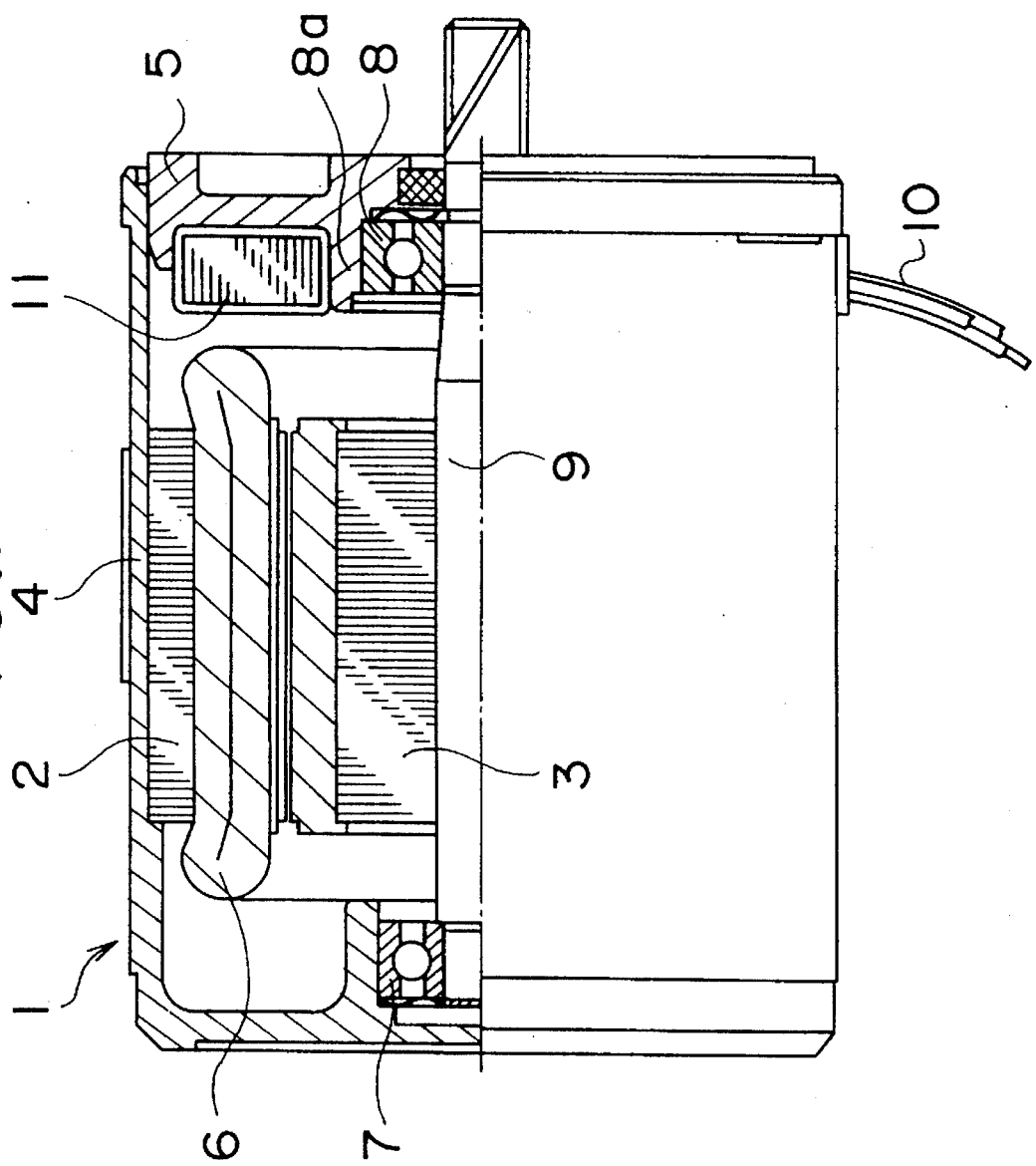
FIG. 1 is a longitudinal sectional view showing an embodiment of a motor with a built-in capacitor according to the present invention.
Figure 2:
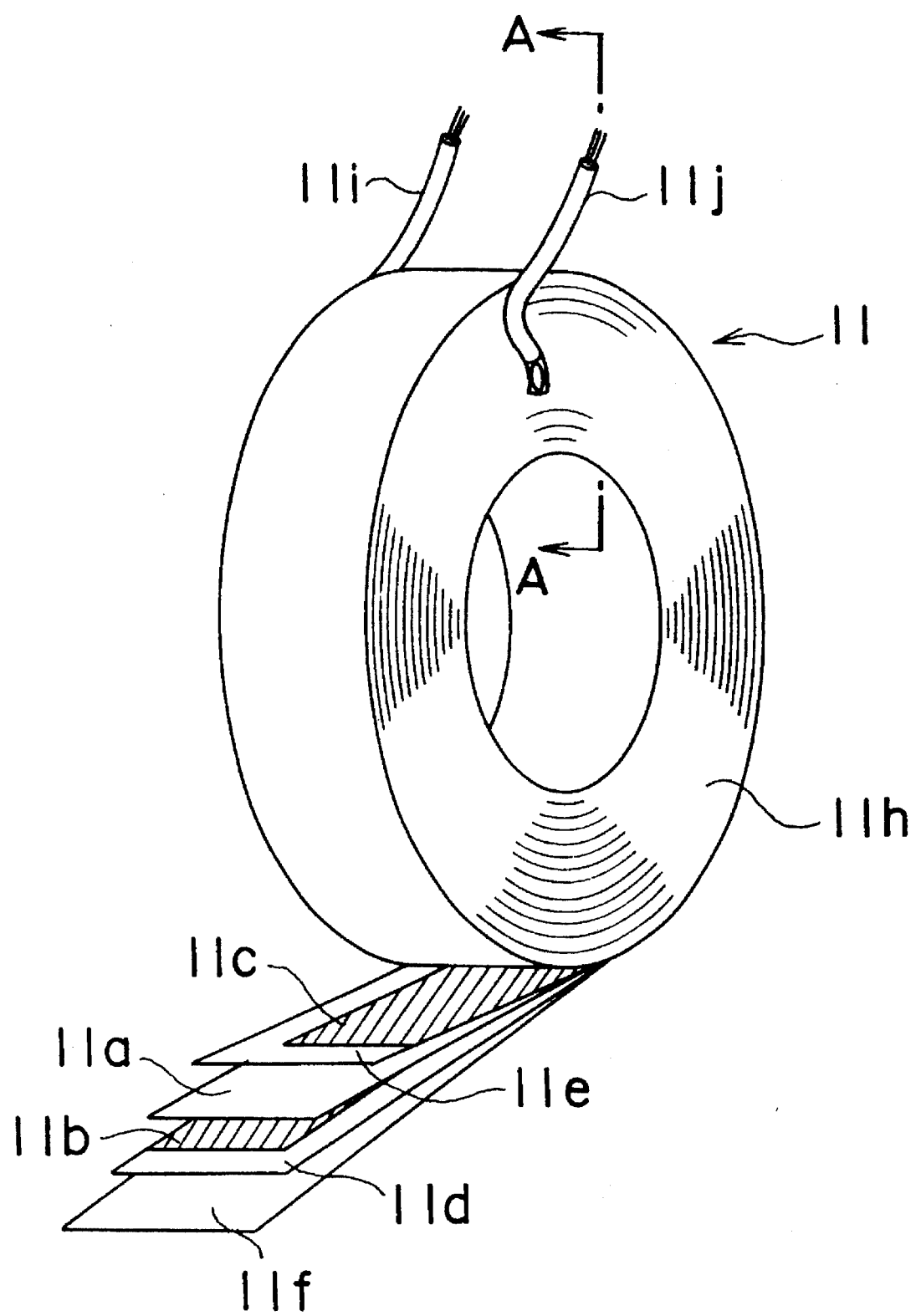
FIG. 2 is a perspective view showing a ring-shaped capacitor.
Figure 3:
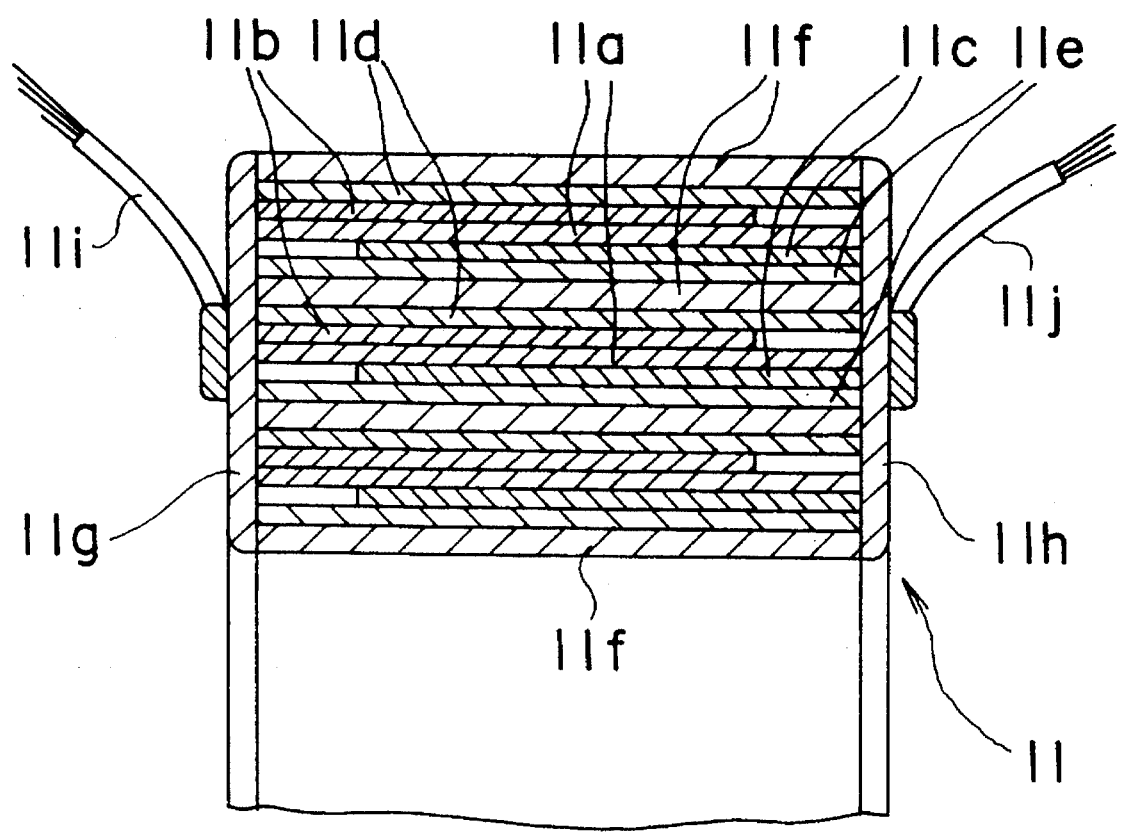
FIG. 3 is a sectional view taken along line A—A of FIG. 2.

Preferred embodiments of the present invention are now described in detail with reference to the accompanying drawings. FIGS. 1 to 3 show a single-phase induction motor according to an embodiment of a motor of the present invention. FIG. 1 is a longitudinal sectional view thereof, FIG. 2 is a perspective view of a ring-shaped capacitor used in the motor of FIG. 1, and FIG. 3 is a sectional view taken along line A—A of FIG. 2.

The single-phase induction motor 1 includes a stator 2 and a rotor 3. The stator 2 is fixedly mounted in a case 4 and the case 4 is closed by a bracket 5. A motor winding 6 is disposed in the case 4 and bearings 7 and 8 for rotatably supporting the rotor 3 are disposed at the sides of the case 4 and the bracket 5. The case 4 and the bracket 5 are mounted by means of screws not shown.

A shaft 9 of the rotor 3 having both ends supported by the bearings 7 and 8 penetrates one bearing 8 and the bracket 5 and is extended to the outside to output mechanical motive power generated by the motor 1. Parts of a plurality of leads 10 from the motor winding 6 penetrate a flexible bush and a hole of the case through a capacitor 11 to be extended to the outside.

The ring-shaped capacitor 11 is disposed in the case 4 in which the bracket 5 of the motor 1 is mounted. The winding 6 of the motor 1 includes a main winding and an auxiliary winding. The capacitor 11 is connected in series to the auxiliary winding having the number of turns larger than that of the main winding to form a starting circuit. In the motor 1 of the embodiment, the capacitor 11 is not disconnected and is connected during the period that the motor 1 is started and is operated.

The ring-shaped capacitor 11 is mounted on an inner side of the bracket 5 by means of an adhesive agent, for example. The shaft 9 of the rotor 3 penetrates a center portion of the bracket 5 and an inner peripheral portion of the center portion is in contact with an outer peripheral portion of a bearing portion 8a which supports the bearing 8 of the shaft 9.

The ring-shaped capacitor 11 may be a capacitor formed into a ring or a doughnut and includes various types of plastic film capacitors, paper capacitors, metallized paper capacitors, ceramic capacitors, laminated capacitors, electrolytic capacitors and semiconductor capacitors.

A structure of the capacitor 11 formed into a ring is now described by way of a plastic film capacitor.

As shown in FIGS. 2 and 3, the plastic film capacitor 11 includes a plastic film 11a and first and second electrodes 11b and 11c formed by evaporating and depositing metal such as zinc or aluminum on one surfaces of first and second plastic films 11d and 11e, respectively. The first electrode 11b is disposed on the slightly left side on the first plastic film 11d and the second electrode 11c is also disposed on the slightly right side on the second plastic film 11e in FIG. 2.

The first and second plastic films 11d and 11e are disposed on both sides of the plastic film 11a so that the first and second electrodes 11b and 11c are brought into contact with both the sides of the plastic film 11a, respectively. That is, the first plastic film 11d on which the first electrode 11b is evaporated, the plastic film 11a and the second plastic film 11e on which the second electrode 11c is evaporated are disposed in order of this description.

The plastic films 11a, 11d and 11e and an insulative plastic film 11f are wound to form a space in the center thereof so that the ring is formed.

In order to electrically pull out the opposite evaporated electrodes 11b and 11c from the right and left sides of the capacitor, metal portions 11g and 11h of zinc or the like such as, for example, metallicon are formed on the right and left side portions of the capacitor in the spraying manner and leads or terminals 11i and 11j are soldered to the metal portions 11g and 11h to thereby form the capacitor 11. Metal foils may be disposed instead of the evaporated electrodes 11b and 11c.

The capacitor 11 is used by connecting it to the motor winding 6 in any of the case where the capacitor 11 is automatically disconnected by a switch not shown after the single-phase induction motor 1 is started or the case where the capacitor is not disconnected from the starting until the operation of the motor. In addition, the capacitor 11 can be used for changing from the normal rotation to the reverse rotation, and vice versa, by exchanging the phases of the currents in the windings of a motor for this purpose, connection points to the windings is controlled by an external switch not shown.

Figure 4:
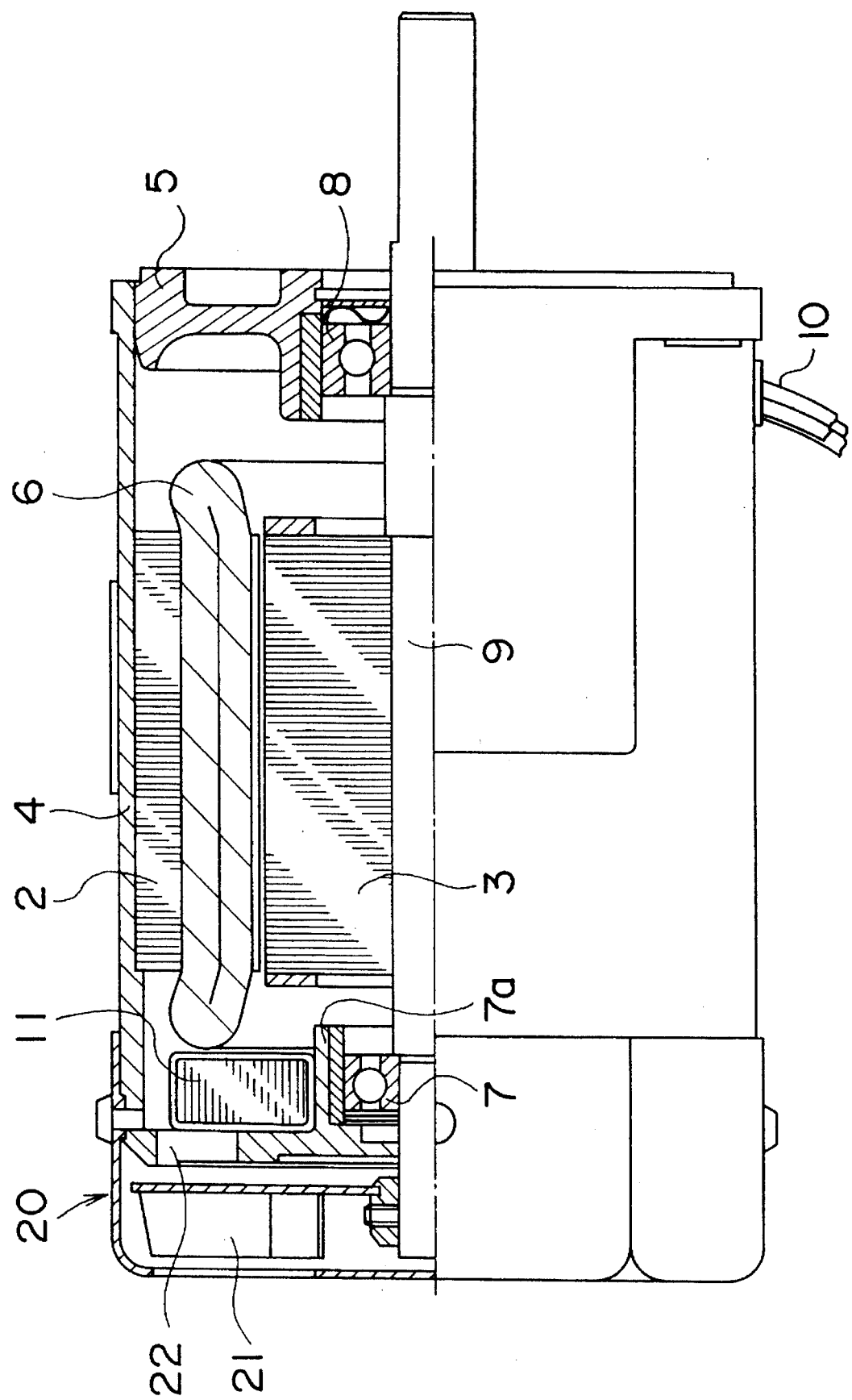
FIG. 4 is a sectional view of a motor with a fan showing a modification of the embodiment.

FIG. 4 is a sectional view of a motor with a capacitor and a fan showing a modification of the embodiment. In FIG. 4, the same elements as those of FIG. 1 are designated by the same reference numerals and description thereof is omitted.

In FIG. 4, a fan 21 is fixedly mounted to an end of the shaft 9 of the rotor and is rotated. The ring-shaped capacitor 11 of a single-phase AC induction motor 20 is disposed at the inner side of the case 4 on the side in which the fan 21 is disposed by means of adhesion, for example, so that an inner peripheral surface of the center portion of the capacitor 11 is in contact with an outer periphery of a bearing portion 7a supporting the bearing 7 of the shaft 9 of the rotor.

Since the capacitor 11 is disposed on the side in the case 4 in which the fan 21 is disposed, the capacitor 11 is cooled by air sent from the fan 21 through a window 22.

FIG. 5 is a partially sectional view of a motor 30 with a capacitor showing another modification of the embodiment including a transmission directly connected to the motor. In FIG. 5, the same elements as those of FIG. 1 are designated by the same reference numerals and description thereof is omitted.

In FIG. 5, a transmission 31 such as, for example, a reduction gear is connected to a single-phase AC induction motor 30 by means of screws not shown. The transmission is constituted by planetary gears including a sun gear disposed in the center portion thereof and three or more planet gears disposed in the outer side thereof to be meshed with the sun gear (not shown). An output shaft 32 of the motor is protruded to the outside through a bearing not shown supported by a bearing portion 33.

The ring-shaped capacitor 11 is disposed on an outer side of a transmission case 31a by means of adhesion so that the inner peripheral surface of the center portion of the capacitor is in contact with a step 33a of the transmission case 31a formed by the bearing portion 33 of the output shaft 32. The capacitor 11 is connected through leads 11i and 11j thereof to the winding 6 of the motor 6.

According to the motor with the capacitor of the embodiment, by forming the capacitor 11 into a ring or doughnut, the inner and outer spaces of the motor can be utilized effectively so that the external shape is made compact as a whole as compared with the prior art motor.

The scope the present invention is not limited to the embodiments and may have other means attaining the same function. Further, the technique of the present invention can be changed and be modified variously within the scope of the invention.

We claim:

1. A motor with a built-in capacitor which is started by means of said capacitor and operates together with said capacitor at least during starting of the motor, wherein said capacitor is formed into a ring so that a shaft of said motor penetrates a central aperture of said capacitor and said capacitor is disposed within said motor so that the shaft of said motor penetrates the central aperture, and wherein said capacitor is disposed at an inner side of a case of said motor so that a radially inner surface of said capacitor which defines the periphery of said central aperture is in contact with an outer periphery of a bearing of said motor.

2. A motor with a built-in capacitor which is started by means of said capacitor and operates together with said capacitor at least during starting of the motor, wherein said capacitor is formed into a ring and said capacitor is disposed on an outer side of a case of a gear mechanism directly connected to said motor so that an output shaft of said gear mechanism penetrates a central aperture of said capacitor.

* * * * *